(12) United States Patent
Lindekugel

(10) Patent No.: US 7,861,819 B2
(45) Date of Patent: Jan. 4, 2011

(54) VEHICLE DRIVE LINE AND A WORKING MACHINE PROVIDED THEREWITH

(75) Inventor: Joseph Lindekugel, Portland, OR (US)

(73) Assignee: Atlas Copco Rock Drills AB, Orebro (SE)

( * ) Notice: Subject to any disclaimer, the term of this patent is extended or adjusted under 35 U.S.C. 154(b) by 177 days.

(21) Appl. No.: 11/989,160

(22) PCT Filed: Jun. 27, 2006

(86) PCT No.: PCT/SE2006/050223

§ 371 (c)(1),
(2), (4) Date: Jan. 22, 2008

(87) PCT Pub. No.: WO2007/018471

PCT Pub. Date: Feb. 15, 2007

(65) Prior Publication Data

US 2009/0133952 A1 May 28, 2009

(30) Foreign Application Priority Data

Aug. 10, 2005 (SE) .................... 0501791

(51) Int. Cl.
*B60K 17/00* (2006.01)
*F16H 57/04* (2010.01)
(52) U.S. Cl. .................... 180/339; 184/6.12
(58) Field of Classification Search .............. 180/339; 184/6.12, 2; 475/161, 159, 160; 60/339
See application file for complete search history.

(56) References Cited

U.S. PATENT DOCUMENTS

| 1,858,533 | A | * | 5/1932 | White .................. 184/6.12 |
| 3,067,830 | A | * | 12/1962 | Lee .................. 180/233 |
| 3,789,943 | A | | 2/1974 | Kampert et al. |
| 4,235,307 | A | * | 11/1980 | Browning et al. .......... 184/6.12 |
| 5,702,321 | A | | 12/1997 | Bakowski et al. |
| 5,944,130 | A | | 8/1999 | Sewell |
| 6,189,640 | B1 | | 2/2001 | Young et al. |
| 7,407,474 | B2 | * | 8/2008 | Smith .................. 494/49 |

FOREIGN PATENT DOCUMENTS

| GB | 1165904 | 6/1967 |
| GB | 2408082 A | 5/2005 |
| WO | WO 2005/042338 A1 | 5/2005 |

* cited by examiner

*Primary Examiner*—Paul N Dickson
*Assistant Examiner*—Keith Frisby
(74) *Attorney, Agent, or Firm*—Mark P. Stone

(57) ABSTRACT

A vehicle drive line (1), comprising an engine (2) provided with an outgoing crank shaft (3), a main transmission unit (4), an intermediate drive shaft (8) that connects the main transmission unit (4) with the crank shaft (3), the intermediate drive shaft (8) being connected to the crank shaft (3) through a second transmission unit (7), and being offset in relation to the crank shaft (3). The drive line (1) comprises a circuit through which a liquid used for lubricating the main transmission unit (4) is conducted to the second transmission unit (7) and used for cooling and lubrication purposes in the latter, and then conducted back to the main transmission unit (4).

13 Claims, 2 Drawing Sheets

VEHICLE DRIVE LINE AND A WORKING MACHINE PROVIDED THEREWITH

TECHNICAL FIELD

The present invention relates to a vehicle driveline, comprising, an engine provided with an outgoing crank shaft, a main transmission unit, an intermediate drive shaft that connects the main transmission unit with the crank shaft, the intermediate drive shaft being connected to the crank shaft through a second transmission unit, and being offset in relation to the crank shaft.

The invention also relates to a working machine provided with such a drive line. In particular, the invention relates to a loader, preferably a mining loader, provided with such a drive line.

Each transmission unit comprises a plurality of gear wheels, or cog wheels, in engagement with each other. The primary task of the second transmission unit is to offset the intermediate drive shaft in relation to the crank shaft in order to make the driveline pass any obstacle located between the crank shaft and the main transmission unit. Such an obstacle may, for example, be a wheel axle and/or any component connected thereto, as will be further discussed later in this text. Accordingly, the transmission ratio in the second transmission unit may be 1:1.

BACKGROUND OF THE INVENTION

Vehicles like mining loaders may require that the drive line, and the engine in particular, be positioned as low as possible, either in order to present a height as low as possible and/or to present a low point of balance.

Thus, prior art suggests that the engine be positioned generally in line with the rest of the drive line, resulting in a low position of the crank shaft. It might be the case that the vehicle has a wheel axle located between the main transmission unit and the engine, thereby forming an obstacle that prevents the crank shaft from being directly connected to the main transmission unit. However, this problem is overcome by means of a second transmission unit that is connected with the crank shaft on one hand and with the main transmission unit via an intermediate drive shaft on the other hand. The intermediate drive shaft is offset in relation to the crank shaft and to the wheel axle by means of the second transmission unit and, accordingly, connects the crank shaft indirectly with the main transmission unit.

According to prior art, the second transmission unit comprises at least two interacting cog wheels arranged in a casing, a first of said cog wheels being connected to the crank shaft and a second thereof being connected to the intermediate drive shaft. This unit is heated during operation, and, therefore, there may be required a separate cooling circuit that provides the second transmission unit with a cooling liquid that is circulated through said casing. The use of a separate cooling circuit adds to the total cost of the drive line and requires a separate handling thereof in connection to service and repair work. Normally, the cooling liquid is oil that needs to be changed at predetermined intervals.

THE OBJECT OF THE INVENTION

It is an object of the present invention to present a drive line the design of which is such that excessive handling of a separate cooling/lubrication circuit and the cooling liquid thereof upon service of the drive line is reduced or eliminated.

SUMMARY OF THE INVENTION

The object of the invention is achieved by means of the initially defined drive line, characterised in that it comprises a circuit through which a liquid used for lubricating the main transmission unit is conducted to the second transmission unit and used for cooling/lubrication purposes in the latter, and then conducted back to the main transmission unit. When the liquid is to be changed, only one circuit, instead of two separate ones, needs to be handled, resulting in saving of labour hours. The possibility of forgetting to service any separate cooling circuit while servicing the lubrication circuit of the main transmission unit is also eliminated.

According to a preferred embodiment of the invention said circuit comprises a pump for pumping said liquid from the main transmission unit to the second transmission unit. Thereby, it can be guaranteed that a sufficient amount of cooling liquid is continuously conducted to the second transmission unit.

Preferably, said circuit comprises a filter located downstream from the second transmission unit as seen in the flow direction of the cooling liquid. Thereby, it is guaranteed that particles or other contamination that might have been introduced into the cooling/lubrication liquid upon cooling of the second transmission unit are trapped and prevented from reaching the main transmission unit.

The invention also refers to a working machine provided with the inventive drive line, in particular a loader provided therewith, and preferably a mining loader provided therewith.

Further features and advantages of the present invention will be presented in the following, detailed description and in the dependent patent claims.

BRIEF DESCRIPTION OF THE DRAWINGS

The invention will now be described further in detail, by way of example, with reference to the annexed drawing on which.

DETAILED DESCRIPTION OF THE INVENTION

Figure 1:
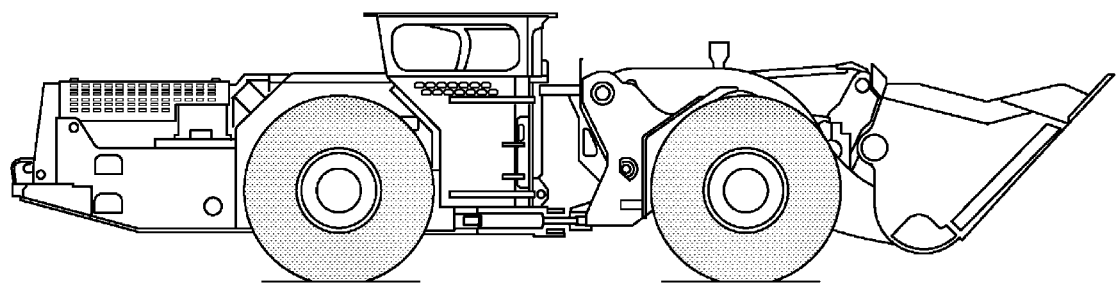
FIG. 1 is a side view of a working machine provided with a drive line according to the invention.

FIG. 1 shows a loader for mining purposes. A characterising feature of such a loader is its low height, permitting it to operate in relatively narrow, or low, tunnels.

In order to achieve such a low height, the driveline, including the engine, is positioned as low as possible.

Figure 2:
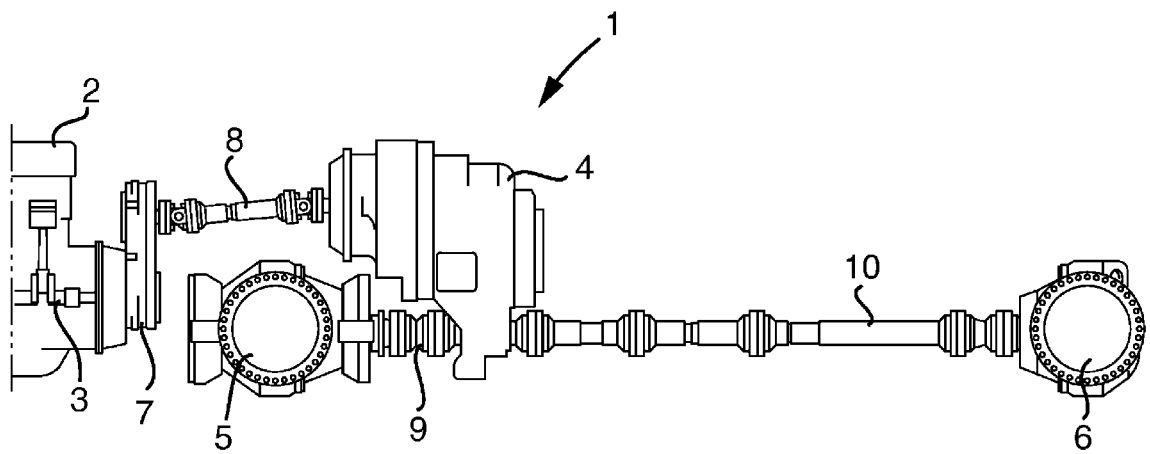
FIG. 2 is a schematic side view of a drive line according to the invention.

FIG. 2 shows a drive line 1 according to a preferred embodiment of the invention. The drive line 1 includes an engine 2 with a crank shaft 3, a main transmission unit 4, a rear wheel axle 5, a front wheel axle 6, a second transmission unit 7 and an intermediate drive shaft 8 that interconnects said transmission units 4, 7. Furthermore, the drive line 1 comprises a first outgoing shaft 9 connecting the main transmission unit 4 with the rear wheel axle 5, and a second outgoing shaft 10 connecting the transmission unit 4 with the front wheel axle 6. Both wheel axles 5, 6 are driven through the main transmission unit. Accordingly, the loader has a 4-wheel drive system. However this is neither necessary nor essential for the invention.

An obstacle formed by the rear wheel axle 5 is located between the engine 2 and the main transmission unit 4. The crank shaft 3 is located at such a level that it cannot be directly connected to the main transmission unit 4 because of the rear wheel axle 5 that, accordingly, represents an obstacle. This problem is solved by means of the second transmission unit 7 and the intermediate drive shaft 8. By means of the second transmission unit 7 the intermediate drive shaft 8 is vertically offset in relation to the crank shaft 3 and the rear wheel axle 5. The intermediate drive shaft 8 crosses, or intersects, the rear wheel axle 5 with a distance thereto. Preferably, as in this case, the intermediate drive shaft 8 extends above said wheel axle 5. The intermediate drive shaft 8 is located at a vertically higher level than the crank shaft 3. It may, but need not, be parallel with the crank shaft 3.

It should be understood that the obstacle between the crank shaft 3 and the main transmission unit could be anything else than the rear wheel axle 5. For example, it could as well be the front wheel axle 6.

However, for a mining loader like the one shown in FIG. 1, the design according to FIG. 2 is the preferred one.

Figure 3:
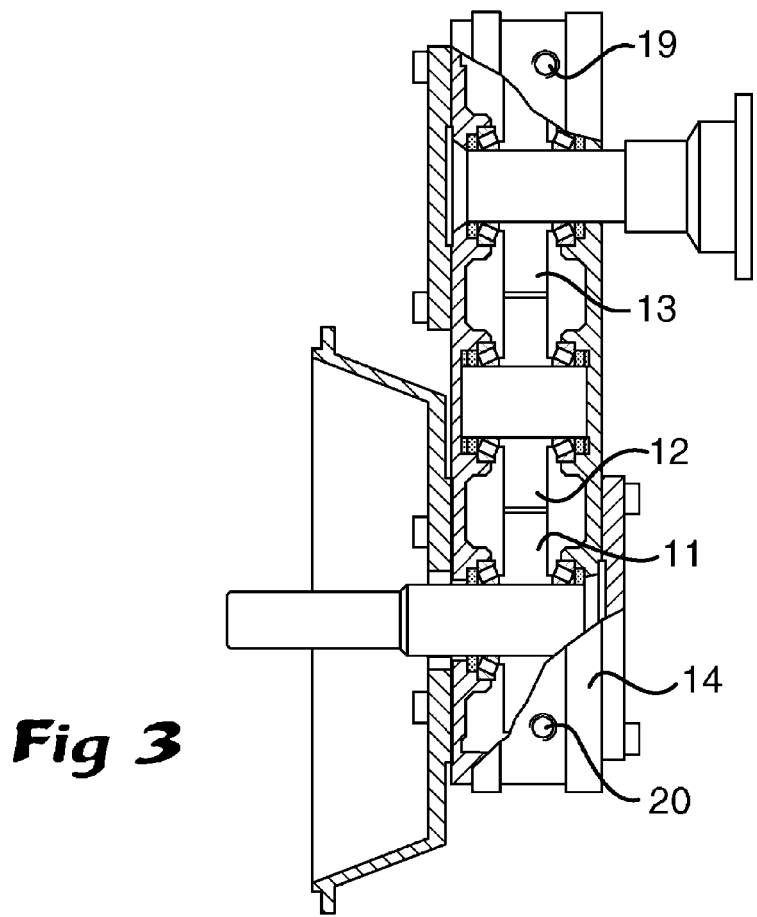
FIG. 3 is a partial cross section of a detail of the driveline in FIG. 2.

As seen in FIG. 3, the second transmission unit 7 comprises at least two, in this case three, interacting cog wheels 11, 12, 13 arranged in a casing 14, a first 11 of said cog wheels being connected to the crank shaft 3 and a second 13 thereof being connected to the intermediate drive shaft 8.

Figure 4:
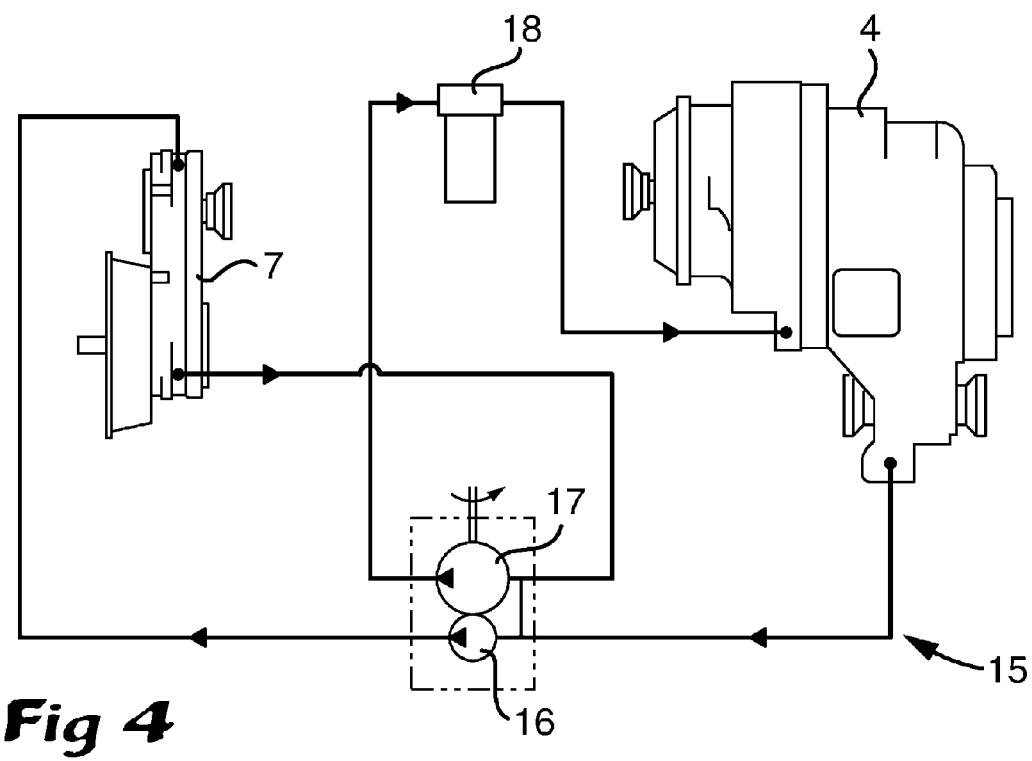
FIG. 4 is a schematic representation of a lubrication/cooling circuit according to the invention, as applied on a driveline according to FIG. 2.

As shown in FIG. 4, the drive line 1 comprises a circuit 15 through which a liquid used for lubricating the main transmission unit 4 is conducted to the second transmission unit 7 and used for cooling purposes in the latter, and then conducted back to the main transmission unit 4. The circuit 15 comprises a pump 16 for pumping said liquid from the main transmission unit 4 to the second transmission unit 7. It also comprises a pump 17 on the downstream side of the second transmission unit 7, as a further contribution to pumping of said liquid. Furthermore, said circuit 15 comprises a filter 18 located downstream from the second transmission unit. Preferably, the liquid is oil that is mainly used for lubrication purposes in the main transmission unit 4. However, said oil might also have some cooling effect in the main transmission unit 4.

As seen in FIG. 3, in order to effectuate the cooling of the second transmission unit 7, the casing 14 thereof is provided with an inlet 19 connected to an upstream part of said circuit 15, and an outlet 20 connected to a downstream part of said circuit 15. Here, the inlet 19 is located in an upper part of the casing 15, while the outlet 20 is located in a lower part thereof. However, other configurations are conceivable, as well as the number of inlets and outlets. Possibly, the inlet or inlets 19 could be provided with a nozzle or the like, in order to further control the distribution of the liquid into the interior of the second transmission unit 7.

It should be noted that the above description of the invention is by way of example. Accordingly, the scope of the invention is only defined by the annexed claims.

The invention claimed is:

1. A vehicle drive line (1), comprising,
an engine (2) provided with an outgoing crank shaft (3),
a main transmission unit (4),
an intermediate drive shaft (8) that indirectly connects the main transmission unit (4) with the crank shaft (3),
the intermediate drive shaft (8) being connected to the crank shaft (3) through a second transmission unit (7), and being offset in relation to the crank shaft (3),
wherein the vehicle drive line comprises a circuit (15) through which a liquid used for lubricating the main transmission unit (4) is conducted to the second transmission unit (7) and used for cooling purposes in the latter, and then conducted back to the main transmission unit (4),
said circuit (15) providing the exclusive circuit for cooling said main transmission unit (4) and said second transmission unit (7),
said circuit (15) comprising a first pump (16) arranged to pump said liquid from the main transmission unit (4) to the second transmission unit (7), and a second pump (17) arranged to pump said liquid from the second transmission unit (7) to the main transmission unit (4).

2. The vehicle drive line according to claim 1, wherein said circuit (15) comprises a filter (18) located downstream from the second transmission unit (7).

3. The vehicle drive line according to claim 2, wherein the filter (18) is located between the second pump (17) and the main transmission unit (4).

4. The vehicle drive line according to claim 1, wherein the vehicle drive line comprises a wheel axle (5), located between the engine (2) and the main transmission unit (4).

5. The vehicle drive line according to claim 4, wherein the intermediate drive shaft (8) crosses the wheel axle (5) with a distance thereto.

6. The vehicle drive line according to claim 5, wherein the intermediate drive shaft (8) extends above the wheel axle (5).

7. The vehicle drive line according to claim 5, wherein the wheel axle (5) is connected to and driven through the main transmission unit (4).

8. The vehicle drive line according to claim 4, wherein the intermediate drive shaft (8) extends above the wheel axle (5).

9. The vehicle drive line according to claim 4, wherein the wheel axle (5) is connected to and driven through the main transmission unit (4).

10. The vehicle drive line according to claim 1, wherein the intermediate drive shaft (8) is located at a vertically higher level than the crank shaft (3).

11. The vehicle drive line according to claim 1, wherein the second transmission unit (7) comprises at least two interacting cog wheels (11, 13) arranged in a casing (14), a first (11) of said cog wheels being connected to the crank shaft (3) and a second (13) of said cog wheels being connected to the intermediate drive shaft (8).

12. The vehicle drive line according to claim 11, wherein said casing (14) is provided with an inlet (19) connected to an upstream part of said circuit (15), and an outlet (20) connected to a downstream part of said circuit (15).

13. A mining loader, provided with a vehicle drive line (1) according to claim 1.

* * * * *